United States Patent [19]

Yang et al.

[11] Patent Number: 5,679,758
[45] Date of Patent: Oct. 21, 1997

[54] METHOD FOR PRODUCING SHAPED ARTICLES OF SOLUBLE WHOLLY AROMATIC POLYAMIDES

[75] Inventors: Jen-Chang Yang, Taipei; Hung-Yi Hsiao, Miao-Li Shiann; Jin-Chyueh Lin, Kao-Hsiung Shiann, all of Taiwan

[73] Assignee: Industrial Technology Research Institute, Hsinchu, Taiwan

[21] Appl. No.: 413,823

[22] Filed: Mar. 30, 1995

[51] Int. Cl.$^6$ .................. C08G 73/10; C08G 63/00; D01D 5/12; B29C 71/00

[52] U.S. Cl. .................. 528/183; 528/328; 528/329.1; 528/338; 528/339; 528/343; 528/348; 528/481; 528/502 B; 528/502 R; 528/503; 264/210.8; 264/235; 264/237

[58] Field of Search .................. 264/235, 210.8, 264/237; 528/183, 348, 329.1, 328, 339, 338, 343, 481, 502 R, 502 B, 503

[56] References Cited

U.S. PATENT DOCUMENTS

| | | | |
|---|---|---|---|
| 3,671,542 | 6/1972 | Kwolek | 260/308 R |
| 3,767,756 | 10/1973 | Blades | 264/184 |
| 3,819,587 | 6/1974 | Kwolek | 260/78 R |
| 3,869,429 | 3/1975 | Blades | 260/785 |
| 5,028,372 | 7/1991 | Brierre et al. | 264/148 |

Primary Examiner—Jeffrey C. Mullis
Assistant Examiner—P. Hampton-Hightower
Attorney, Agent, or Firm—Sughrue, Mion, Zinn, Macpeak & Seas

[57] ABSTRACT

Shaped articles are obtained from a polymerization mixture of soluble wholly aromatic polyamides in a gel state.

14 Claims, 2 Drawing Sheets

METHOD FOR PRODUCING SHAPED ARTICLES OF SOLUBLE WHOLLY AROMATIC POLYAMIDES

FIELD OF THE INVENTION

The present invention relates to shaped articles such as fibrids, fibers, films, woven and nonwoven fabrics, and permeable membranes, which are obtained from the polymerization mixture of soluble wholly aromatic polyamides in a gel state.

BACKGROUND OF THE INVENTION

It is well known in the art that wholly aromatic polyamides can be conveniently prepared by the method of low temperature solution polymerization. [P. W. Morgan, "Condensation Polymers by Interfacial and Solution methods", Polymeric Reviews, vol. 10, Interscience, New York (1965)]. A good example is the preparation of poly(m-phenylene isophthalamide) (MPD-I) in an amide solvent. [W. Sweeny, U.S. Pat. No. 3,287,324 (1966)]. MPD-I remains soluble in the polymerization mixture and gives an isotropic solution which can be extruded directly to form fiber. Because of its excellent thermal stability and other physical properties, MPD-I fiber was the first aromatic polyamide to be commercialized in 1962 under the tradename of NOMEX aramid by E. I. du Pont de Nemours & Co., Inc. Other examples are provided by the preparation of para-oriented aromatic polyamides in a solvent/salt mixture at relatively low temperatures. [S. L. Kwolek, U.S. Pat. No. 3,671,542 (1972) and U.S. Pat. No. 3,819,587 (1974); H. Blades, U.S. Pat. No. 3,767,756 (1973) and U.S. Pat. No. 3,869,429 (1975)]. These rigid-chain polymers exhibit liquid crystal behavior during the early stage of polymerization and will phase out from the polymerization mixture at relatively high polymer molecular weight when their solubility is exceeded.

The phased-out rigid-chain polymers can be dissolved in a strong acid such as sulfuric acid to form anisotropic solutions. Among them can be mentioned poly(p-phenylene terephthalamide) (PPD-T). The orientation and phase transition of a polymerization mixture of PPD-T in an amide/salt solvent from liquid to gel have been studied in depth. [R. T. Brierre, et. al., U.S. Pat. No. 5,028,372 (1991)]. The fiber of PPD-T was commercialized by the Du Pont Company under the tradename of KEVLAR aramid in 1972. In all cases, the formation of domains of ordered microstructures in the polymerization mixture or process solution has only been observed with the anisotropic rigid-chain polymers such as PPD-T and other paraaramids.

SUMMARY OF THE INVENTION

It has now been found in the course of this invention that the low temperature solution polymerization of soluble wholly aromatic polyamides such as MPD-I in an amide solvent can give rise to a gel at relatively high polymer molecular weights and polymer concentrations. The gel mixture can be formed into an isotropic solution when it is heated or neutralized.

It is therefore an object of the invention to provide a method for producing shaped articles from a polymerization mixture of soluble wholly aromatic polyamides in a gel state in order to acquire the property advantages such as those obtainable with gel-spun fibers.

Specifically, the object of the invention is attained by providing a method including the steps of forming a polymerization mixture containing at least one soluble wholly aromatic polyamide and at least one amide solvent by low temperature solution polymerization, deforming the polymerization mixture while in the liquid state, cooling the deformed polymerization mixture to below about 50° C. to form a gel, drawing the gel while precipitating the polymer by extraction in an amide solvent at selected temperatures, followed by washing and drying to produce a shaped article in continuous forms such as fibers, films and sheets. Alternatively, shaped articles of discontinuous forms such as pulp and fibrids can be produced by cooling the polymerization mixture to below about 50° C. to obtain a gel, mixing the gel with an aqueous solution of an amide solvent at below the freezing temperature of the gel, causing the gel to precipitate while disintegrating it to form small particles in a high shear field.

According to an aspect of the inventive methods, the polymer concentration is above 15 weight percent, and the wholly aromatic polyamide has an inherent viscosity of above 0.6 dL/g.

BRIEF DESCRIPTION OF THE DRAWINGS

The present invention will be described in detail with reference to the illustrative examples and the accompanying drawings, in which.

DETAILED DESCRIPTION OF THE INVENTION

The term "soluble aromatic polyamide" means those aromatic polyamides that remain soluble in their polymerization mixture at relatively high polymer molecular weight and high polymer concentration. They include linear polymers containing at least 85 mole percent of repeat units of the following formulas (I) and (II):

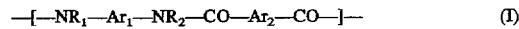

—[—NR$_1$—Ar$_1$—NR$_2$—CO—Ar$_2$—CO—]—    (I)

—[—NR$_3$—Ar$_3$—CO—]—    (II)

wherein Ar$_1$, Ar$_2$ and Ar$_3$ are aromatic radicals, and Ar$_1$ and Ar$_2$ may be the same or different; R$_1$, R$_2$ and R$_3$ are a lower alkyl group or hydrogen, and R$_1$ and R$_2$ may be the same or different.

In accordance with this invention, the method for preparing aromatic polyamides of Formula (I) includes reacting an aromatic diamine with an aromatic diacid chloride in generally stoichiometric amounts in an amide solvent at −20° C. to below about 100° C. A third ingredient, either a diamine or a diacid chloride, is included in the polymerization reaction when preparing an aromatic copolyamide. The method for preparing aromatic polyamides of Formula (II) includes self-polycondensation of an aromatic amino-acid chloride in an amide solvent at low temperatures.

In the most preferred form of this invention, m-phenylene diamine (MPD) is reacted with isophthaloyl chloride (ICl) in N-methyl-2-pyrrolidone (NMP) to produce poly(m-phenylene isophthalamide) (MPD-I). The stoichiometric ratio of MPD/ICl is in the range of from 0.85 to 1.15. The polymer concentration in the polymerization mixture is above 10 percent by weight, preferably above 15 percent by weight. The polymer molecular weight, as measured by inherent viscosity at 0.5 percent in 97 percent sulfuric acid at 25° C. is above about 0.6 dL/g, preferably above 0.8 dL/g.

In another embodiment, the wholly aromatic polyamide contains at least 85 mole percent of the repeat units of m-phenylene isophthalamide.

Figure 1:
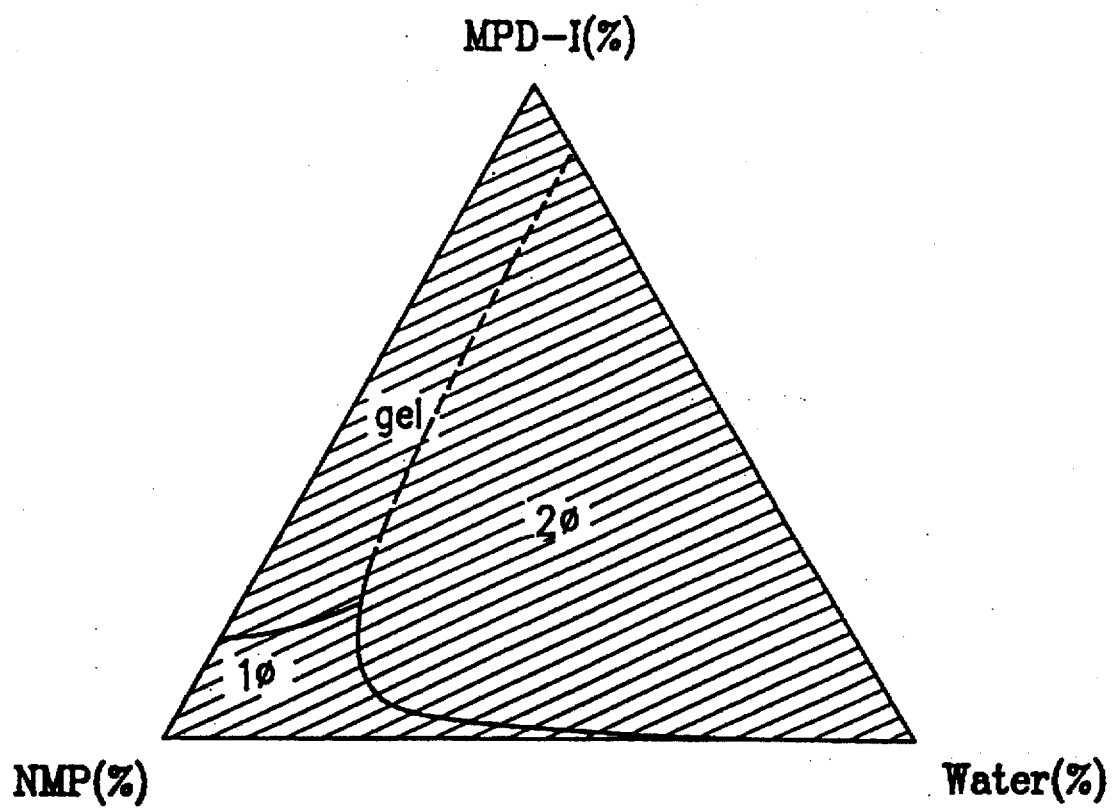
FIG. 1 is a phase diagram of an MPD-I/N-methyl-2-pyrrolidone (NMP)/Water system at room temperature in which the inherent viscosity ($\eta_{inh}$) of MPD-I was 1.1 dL/g.
Figure 2:
FIG. 2. is a cross polarized optical micrograph, 200×, showing fibrids of MPD-I prepared from an MPD-I/NMP gel.
Figure 3:
FIG. 3. is a cross polarized optical micrograph, 200×, showing fibrids of MPD-I prepared from an MPD-I/NMP isotropic solution.

The polymerization mixture of this invention forms a gel under specific conditions for a given polymer/solvent system. In general, the polymer molecular weight, solution composition, solvent power, temperature and the presence of water all tend to affect the gel formation. The effect of solution composition on gel formation is illustrated by the phase diagram of MPD-I/NMP/Water at room temperature shown in FIG. 1. The gel formation for a given solution composition is thermoreversible, i.e., the gel phase is formed at the end of the low temperature polymerization reaction and reverses back to the isotropic solution phase when the gel is heated above about 40° C.

Shaped articles such as fibrids, fibers, films, woven and nonwoven fabrics and membranes can be prepared from the gel of the polymerization mixture of a polymer/solvent system. Example 1 below illustrates the manufacture of discontinuous shaped articles, such as fibrids and paper. A process for the manufacture of continuous shaped articles, such as fibers and films, can be summarized as follows: (a) while maintaining the polymer/solvent mixture (e.g. MPD-I/NMP) in a solution state at a temperature below 50° C., extrude (deform) the mixture through a spinneret; (b) cool the mixture to form a gel; (c) introduce the gel into a coagulation bath and continue operating as conventional solution spinning process. As will become apparent hereinafter, such shaped articles will bear advantages in processing and physical properties over those prepared conventionally from the isotropic solution of the same polymer/solvent system.

The invention will now be described in greater detail with reference to the following non-limiting examples.

EXAMPLE 1

This example illustrates the preparation of MPD-I fibrids from the gel of an MPD-I/NMP polymerization mixture and the subsequent preparation of an industrial paper from MPD-I staple and fibrids. NOMEX aramid staple, manufactured by E. I. du Pont de Nemours & Co., Inc., was employed as the MPD-I staple.

In a 5-liter jacketed cylindrical glass reactor with a pair of wall-wiping helical mixing blades was placed a mixture of 409.0 g (3.78 mole) of m-phenylenediamine (MPD) in 3605 g (3500 ml) of anhydrous N-methyl-2-pyrrolidone (NMP) under nitrogen purge. With the mixing blades at gentle stirring, ice water was circulated through the reactor jacket in order to cool the MPD/NMP solution to about 0° C. After about 15 minutes, 767.9 g (3.78 mole) of isophthaloyl chloride (ICl) in fine powder form was slowly added to the glass reactor. As the reactor temperature began to rise and the reaction mixture became increasingly viscous, the circulation of ice water through the reactor jacket was continued and the mixing speed was gradually increased. After about 20 minutes of reaction time, the reaction mixture became a highly viscous gel-like mass of a light amber color. The reaction was terminated at that time by transferring the reaction mixture into a storage vessel and allowing it to stand. The polymerization mixture contained about 20% by weight of MPD-I polymer. The inherent viscosity ($\eta_{inh}$) of aromatic polyamides of this invention was measured at a polymer concentration (c) of 0.5 g/100 ml in 97% concentrated sulfuric acid at 30° C. and determined from the relative viscosity ($\eta_{rel}$) according to the following equation: $\eta_{inh}=\ln(\eta_{rel})/c$. The polymer was found to have an inherent viscosity of 1.1 dL/g.

A piece of about 25 grams MPD-I/NMP gel and 75 grams NMP were placed in a grinder. The gel was broken into pieces with an average size approximately below 0.1 millimeter and was fully mixed with NMP. The gel mixture was discharged into a blender and mixed with 400 ml water at about 1700 rpm for 30 seconds. The resulting mixture was dewatered by vacuum filtration, washed, and dewatered again. The polymer particles, which are known as fibrids in the trade, are mixed with water to form a 1% by weight slurry of MPD-I fibrids in water. To prepare an industrial paper, 4.77 grams of the above fibrid/water slurry and 0.9 grams of NOMEX staple with an average length of about 3 millimeter were mixed in a blender containing 100 ml water for 1 minute and then dewatered by vacuum filtration to form a handsheet with a basis weight of 150 g/m². The wet handsheet was dried in air at ambient temperature for 24 hours. It was calendared with a hot press under a pressure of 600 kg/cm² for 2 minutes at 350° C.

The process conditions for the preparation of fibrids and paper as well as the paper properties are summarized in Table 1.

The tensile breaking strength, modulus, and elongation were measured according to the procedure of TAPPI T-404. The results on 10 specimens were averaged.

Comparative Example 1

This example illustrates the preparation of MPD-I fibrids from the isotropic solution of an MPD-I/NMP polymerization mixture and the subsequent preparation of paper from MPD-I staple and fibrids.

The procedures of Example 1 were followed except that an isotropic solution of an MPD-I/NMP polymerization mixture was used for the preparation of MPD-I fibrids.

The process conditions of fibrid and paper preparation as well as the paper properties described above are summarized in Table 1. It can be seen that the paper of this example exhibited considerably lower break strength, modulus and permeability than the paper of Example 1.

TABLE 1

|  | Example 1 | Comparative Example 1 |
|---|---|---|
| Fibrid Preparation | | |
| MPD-I/NMP mixture | Gel | Neutralized Isotropic Solution |
| Polymer $\eta_{inh}$, (dL/g) | 1.1 | 1.1 |
| Concentration, wt % | 5 | 5 |
| Solution phase | Gel | Isotropic |
| Grinder speed, rpm | 1700 | 1700 |
| Aspect ratio (L/D) | 5.9 ± 3.2 | 6.2 ± 5.2 |
| Paper Preparation | | |
| MPD-I staple | NOMEX | NOMEX |
| Fibrid-content (wt. %) | 5 | 5 |
| Thickness (mm) | 0.31 | 0.31 |
| Paper Properties | | |
| Break strength (N/cm²) | 582 | 387 |
| Elongation (%) | 1.2 | 1.2 |
| Modulus (N/cm²) | $5.95 \times 10^4$ | $3.95 \times 10^4$ |
| Permeability (sec/300 ml) | 0.9 | 0.6 |

EXAMPLE 2

This example illustrates the effect of alternate process conditions on the properties of MPD-I papers prepared from an MPD-I/NMP gel.

The process of Example 1 was repeated except that the polymerization solids was changed to 20% and 30% by weight, the fibrid content was changed to 50% by weight, and the paper thickness was changed to 0.13 mm. The physical properties of MPD-I paper specimens thus prepared are summarized in Table 2. It can be seen that increasing the polymerization solids increases the break strength and modulus of MPD-I paper, but has little effect on its elongation at break.

Comparative Example 2

This example illustrates the disadvantageous properties of MPD-I papers prepared from an MPD-I/NMP solution as compared to those of Example 2.

The process conditions of Example 2 were repeated except that an isotropic solution of a neutralized MPD-I/NMP polymerization mixture was used in the preparation of MPD-I/NMP fibrids. The physical properties of MPD-I paper specimens are also summarized in Table 2. It can be seen that the break strength and modulus of these MPD-I papers are significantly poorer than those of Example 2.

TABLE 2

|  | Example 2 | | Comparative Example 2 | |
|---|---|---|---|---|
| Polymerization |  |  |  |  |
| solids (%) | 20 | 30 | 20 | 30 |
| Fibrid Preparation | Gel | Gel | Neutralized Isotropic Solution | |
| Paper Preparation |  |  |  |  |
| MPD-I Staple | NOMEX | NOMEX | NOMEX | NOMEX |
| Fibrid content (wt %) | 50 | 50 | 50 | 50 |
| Thickness (mm) | 0.13 | 0.13 | 0.13 | 0.13 |
| Paper properties |  |  |  |  |
| Break strength (N/cm$^2$) | 2283 | 2715 | 1646 | 1715 |
| Elongation (%) | 5.4 | 5.4 | 3.2 | 3.8 |
| Modulus (N/cm$^2$) | $1.12 \times 10^5$ | $1.29 \times 10^5$ | $9.3 \times 10^4$ | $9.67 \times 10^4$ |

While the invention has been described in detail and with reference to specific embodiments thereof, it will be apparent to one skilled in the art that various changes and modifications can be made therein without departing from the spirit and scope thereof.

What is claimed is:

1. A method for producing a gel from an isotropic polymerization mixture of soluble wholly aromatic polyamide, comprising the following steps:

forming an isotropic polymerization mixture containing at least one soluble wholly aromatic polyamide and at least one amide solvent by low temperature solution polymerization, wherein the polymer concentration is above 10 weight percent, the soluble wholly aromatic polyamide has an inherent viscosity above 0.6 dL/g, and at least 85 mole percent of the recurring structural units of said soluble wholly aromatic polyamide is represented by the general formula (I) or (II):

$$—[—NR_1—Ar_1—NR_2—CO—Ar_2—CO—]— \quad (I)$$

$$—[NR_3—Ar_3—CO—]— \quad (II)$$

wherein $Ar_1$, $Ar_2$ and $Ar_3$ are an aromatic group, and $Ar_1$ and $Ar_2$ are the same or different, $R_1$ and $R_2$ and $R_3$ are a lower alkyl group or a hydrogen atom, $R_1$ and $R_2$ are the same or different; and cooling the isotropic polymerization mixture to below about 50° C. to obtain the gel.

2. The method as claimed in claim 1, wherein the polymer concentration is above 15 weight percent.

3. The method as claimed in claim 1, wherein the wholly aromatic polyamide has an inherent viscosity above 0.8 dL/g.

4. The method as claimed in claim 1, wherein said soluble wholly aromatic polyamide is poly(m-phenylene isophthalamide).

5. The method as claimed in claim 1, wherein said soluble wholly aromatic polyamide contains at least 85 mole percent of repeat units of m-phenylene isophthalamide.

6. The method as claimed in claim 1, wherein said amide solvent is N-methyl-2-pyrrolidone.

7. A method for producing a shaped article of continuous form, comprising the following steps:

deforming an isotropic polymerization mixture in a liquid state and containing at least one soluble wholly aromatic polyamide and at least one amide solvent by low temperature solution polymerization, wherein the polymer concentration is above 10 weight percent, the soluble wholly aromatic polyamide has an inherent viscosity above 0.6 dL/g, at least 85 mole percent of the recurring structural units of said soluble wholly aromatic polyamide is represented by the general formula (I) or (II):

$$—[—NR_1—Ar_1—NR_2—CO—Ar_2—CO—]— \quad (I)$$

$$—[—NR_3—Ar_3—CO—]— \quad (II)$$

wherein $Ar_1$, $Ar_2$ and $Ar_3$ are an aromatic group, and $Ar_1$ and $Ar_2$ are the same or different, $R_1$, $R_2$ and $R_3$ are a lower alkyl group or a hydrogen atom, and $R_1$ and $R_2$ are the same or different;

cooling the deformed isotropic polymerization mixture to below about 50° C. to form a gel;

drawing the gel while precipitating the polymer by extraction in an amide solvent, and washing and drying to form the shaped article in continuous form.

8. A shaped article obtained by the method as claimed in claim 7.

9. The shaped article of claim 8 in the form of a fiber.

10. The shaped article of claim 8 in the form of a film.

11. A method for producing a shaped article, comprising the following steps:

forming an isotropic polymerization mixture containing at least one soluble wholly aromatic polyamide and at least one amide solvent by low temperature solution polymerization, wherein the polymer concentration is above 10 weight percent, the soluble wholly aromatic polyamide has an inherent viscosity above 0.6 dL/g, and at least 85 mole percent of the recurring structural units of said soluble wholly aromatic polyamide is represented by the general formula (I) or (II):

$$—[—NR_1—Ar_1—NR_2—CO—Ar_2—CO—]— \quad (I)$$

$$—[—NR_3—Ar_3—CO—]— \quad (II)$$

wherein $Ar_1$, $Ar_2$, and $Ar_3$ are an aromatic group, and $Ar_1$ and $Ar_2$ are the same or different, $R_1$, $R_2$ and $R_3$ are a lower alkyl group or a hydrogen atom, $R_1$ and $R_2$ are the same or different;

cooling the isotropic polymerization mixture to below about 50° C. to obtain a gel;

mixing the gel with an aqueous solution of an amide solvent at below the freezing temperature of the gel; and causing the gel to precipitate, while disintegrating to form particles in a high shear field.

12. The shaped article of claim 11 in the form of a fibrid.

13. The shaped article of claim 11 being in the form of a paper product.

14. The method as claimed in claim 1 wherein the aromatic polyamide is a meta bonded polyaramide.

* * * * *